Sept. 14, 1926.
O. E. WILTSIE
ICE CREAM CABINET
Original Filed Jan. 10, 1922
1,599,506
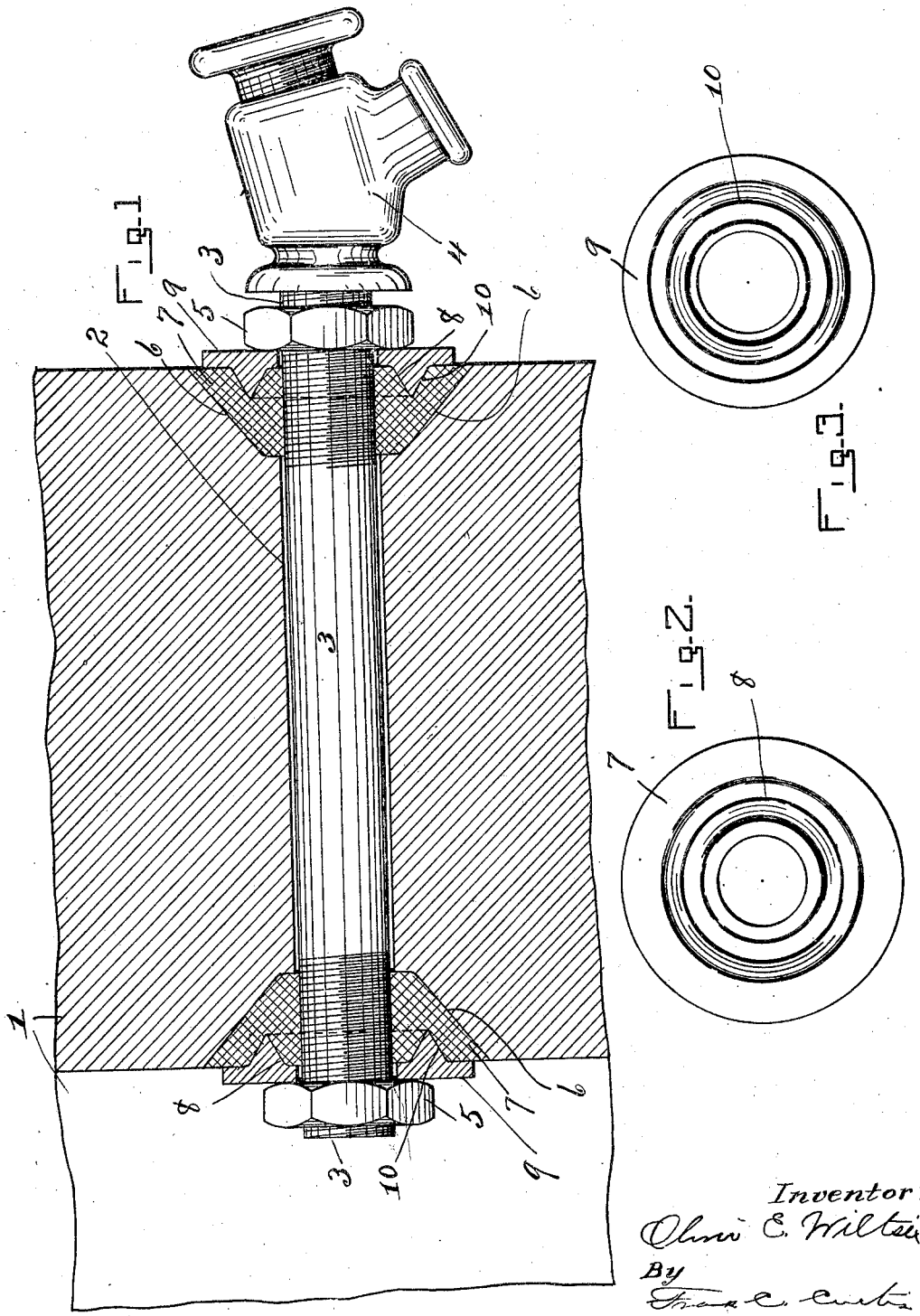
Inventor
Oliver E. Wiltsie
By
Frank C. Curtis
Attorney Patented Sept. 14, 1926.

1,599,506

UNITED STATES PATENT OFFICE.

OLIVER E. WILTSIE, OF TROY, NEW YORK, ASSIGNOR OF ONE-HALF TO EDWIN B. SALISBURY, OF WATERFORD, NEW YORK.

ICE-CREAM CABINET.

Application filed January 10, 1922, Serial No. 528,237. Renewed April 5, 1926.

Reference may be had to the accompanying drawings, and the supreme characters marked thereon, which form a part of this specification. Similar characters refer to similar parts in the several figures therein.

The principal object of the invention is to make a nonleakable joint between the wall of an ice-cream cabinet or the like and a pipe secured within an opening extending through said wall.

Other objects will appear in connection with the following description.

Fig. 1 of the drawings is a vertical section taken through a broken-away portion of the wall of an ice-cream cabinet illustrating the employment of my invention to provide a nonleakable joint between said wall and a pipe secured within an opening extending through the wall.

Fig. 2 is a plan or face view of the rubber gasket detached.

Fig. 3 is a similar view of the washer which cooperates with said gasket to make a tight joint.

Referring to the drawings wherein the invention is shown in preferred form, 1 is the wall of an ice-cream cabinet through which extends an opening, 2, adapted to receive a pipe, 3, through which the liquid contents of the cabinet may be drained when desired through a drain-valve, 4, on the outer end of said pipe, 3.

The ends of the pipe, 3, are screw-threaded to receive the nuts, 5.

The ends of the opening, 2, are countersunk in frustoconical form as shown at 6, adapted to receive a similarly shaped rubber gasket, 7, closely fitting the neighboring end of the pipe, 3.

The outer face of the gasket, 7, is formed with an annular groove, 8, V-shaped in cross section. This annular groove, 8, extends into the conical body of the gasket.

Between the nut, 5, and the neighboring gasket, 7, I interpose a washer, 9, having an annular flange, 10, V-shaped in cross section to engage the annular groove, 8, in the neighboring rubber gasket, 7.

I have shown the construction just described duplicated at opposite ends of the pipe, 3, although when desired it may be applied to only one end of the pipe, and the other end of the pipe may be secured in position in any known manner.

As the nut, 5, is set up against the washer, 9, the washer is driven against the grooved face of the rubber gasket, 7, and the flange, 10, on the washer acts as a wedge to force the rubber gasket both outwardly against the wall of the countersunk, 6, and inwardly against the pipe, 3, thereby making a nonleakable or waterproof joint between the pipe 3, and the wall, 1, of the cabinet.

While I have shown and described the invention as applied to an ice-cream cabinet, it is equally applicable to other liquid-containers such as vats, tanks and the like where it is desired to make a watertight or nonleakable joint between a wall and a pipe secured within an opening through the wall.

What I claim as new and desire to secure by Letters Patent is—

The combination with a wall provided with an opening therethrough and a conical countersink at one end of said opening; of a screw-threaded pipe secured within said opening; a conical rubber gasket closely fitting said pipe and said countersink and provided in its outer side with an annular groove V-shaped in cross-section extending into the conical body of the gasket; a washer engageable with the outer side of said gasket and having an annular flange V-shaped in cross-section engageable with said groove in the gasket; and a nut fitting the screw-threaded portion of said pipe engageable with said washer.

In testimony whereof, I have hereunto set my hand this 9th day of January, 1922.

OLIVER E. WILTSIE.